United States Patent [19]
Geissler et al.

[11] Patent Number: 5,994,438
[45] Date of Patent: Nov. 30, 1999

[54] PULVERULENT ADHESIVE COMPOSITION

[75] Inventors: Ulrich Geissler, Hochheim; Helmut Hintz, Karben; Ulrike Vogt-Saggau, Bensheim, all of Germany

[73] Assignee: Hoeschst Aktiengesellschaft, Frankfurt, Germany

[21] Appl. No.: 08/825,951

[22] Filed: Apr. 3, 1997

[30] Foreign Application Priority Data

Apr. 6, 1996 [DE] Germany ............................ 196 13 931

[51] Int. Cl.$^6$ ............................ C08L 93/04; C08L 45/00; C08L 33/10; C09J 193/04
[52] U.S. Cl. ........................ 524/272; 524/499; 524/764; 525/210; 525/211; 525/222; 525/227; 156/327
[58] Field of Search ................................ 524/272, 499; 525/210, 211, 222, 227; 156/327

[56] References Cited

U.S. PATENT DOCUMENTS

| | | | |
|---|---|---|---|
| 2,550,503 | 4/1951 | Turnbull | 524/272 |
| 2,765,286 | 10/1956 | Goldberg | 524/272 |
| 4,532,295 | 7/1985 | Brabetz et al. | 524/827 |
| 4,542,184 | 9/1985 | Eck et al. | 524/827 |
| 4,560,724 | 12/1985 | Brabetz et al. | 524/734 |
| 4,654,388 | 3/1987 | Lofgren | 524/272 |
| 4,731,402 | 3/1988 | Penzel et al. | 524/273 |
| 4,975,481 | 12/1990 | Tamm et al. | 524/317 |
| 5,196,468 | 3/1993 | Schwerzel et al. | 524/272 |
| 5,322,731 | 6/1994 | Callahan, Jr. et al. | 526/328.5 |
| 5,534,571 | 7/1996 | Aydin et al. | 524/272 |

FOREIGN PATENT DOCUMENTS 2 301 497  8/1973  Germany .

OTHER PUBLICATIONS

TRGS 610/GISCODE, Jul. (1994), pp. 32–35.

*Primary Examiner*—Peter A. Szekely
*Attorney, Agent, or Firm*—Foley & Lardner

[57] ABSTRACT

A pulverulent adhesive composition which comprises (a) at least one polymer selected from the group consisting of vinyl ester polymers, (meth)acrylate polymers and styrene (meth)acrylate polymers, (b) at least one tackifying resin (tackifier) and, optionally, (c) one or more protective colloids, and, optionally, (d) one or more anticaking agents. The present composition is suitable for use in formulations used for the adhesive bonding of porous and/or semiporous substrates.

23 Claims, No Drawings

PULVERULENT ADHESIVE COMPOSITION

BACKGROUND OF THE INVENTION

1. Field of the Invention

The present invention relates to pulverulent adhesive compositions, to processes for their preparation and to their use in formulations for the adhesive bonding of porous and semiporous substrates.

2. Description of Related Art

In order to avoid solvent wastes and solvent emissions, aqueous dispersions are increasingly being employed, in accordance with TRGS 610/GISCODE, as binders for producing pollutant-free adhesives. Suitable aqueous dispersions usually include, in addition to a synthetic, free-radically polymerized polymer, also tackifying resins, known as tackifiers. Such aqueous dispersions are described, for example, in U.S. Pat. No. 4,654,388, DE-A 23 01 497, EP-A 0 221 461, EP-A 0 315 070, EP-A 0 490 191 and EP-A 0 620 243.

These resins are generally rosins or esters thereof, and also hydrocarbon resins, which can if desired be esterified or otherwise modified. Aqueous resin dispersions with resin contents of between 50 and 70% by weight are generally also employed as tackifiers. The tackifier resin is added, generally in the form of an organic solution or else as a resin melt, to an aqueous dispersion of the polymer, or is added to the dispersion in combination with a wetting agent, plasticizer or high-boiling component. When aqueous resin dispersions are used, all that is generally required is a simple combination with a polymer dispersion appropriate as a binder. Since aqueous products form a good nutrient substrate for microorganisms, they are generally treated with a preservative. Examples of preservatives employed include chloroacetamide, N-methylolchloroacetamide, 2-bromo-2-nitropropane-1,3-diol or isothiazolinones. EP-A 0 134 451 discloses dispersion powders which can be employed for preparing adhesives but which do not themselves possess sufficient tack.

SUMMARY OF THE INVENTION

An object of the present invention is to provide an adhesive which offers high tack coupled with adequate storage stability and frost resistance and which, furthermore, generally requires no addition of preservatives that are objectionable on health grounds.

A further object of the invention resides in providing a method for producing the pulverulent adhesive compositions, and methods of using same.

In accordance with these and other objectives, there is provided, in accordance with one aspect of the present invention, a pulverulent adhesive composition which comprises a polymer and a tackifier resin.

The present invention provides a pulverulent adhesive composition comprising (a) at least one polymer selected from the group consisting of vinyl ester polymers, (meth)acrylate polymers and styrene(meth)acrylate polymers, (b) at least one tackifying resin (tackifier) optionally, (c) one or more protective colloids, and optionally, (d) one or more anticaking agents.

In accordance with another aspect of the invention, there has been provided a process for preparing a pulverulent adhesive composition of the above type, comprising drying a dispersion comprising said polymer (a), said tackifier resin (b) and, optionally, said protective colloid (c) and, optionally, said anticaking agent (d).

Additional objects, features and advantages of the invention will be set forth in the description which follows, and in part will be obvious from the description, or may be learned by practice of the invention. The objects, features and advantages of the invention may be realized and obtained by means of the instrumentalities and combinations particularly pointed out in the appended claims.

DETAILED DESCRIPTION OF PREFERRED EMBODIMENTS

Particularly suitable vinyl ester polymers (a) include vinyl acetate homopolymers or copolymers of vinyl acetate with ethylene and/or other vinyl esters, preferably vinyl propionate, vinyl pivalate, vinyl esters of ®Versatic acid 9, 10 or 11 (Shell-Chemie), vinyl 2-ethylhexanoate and/or esters of acrylic and/or methacrylic acid with straight-chain, branched or cyclic alcohols having 1 to 22 carbon atoms.

If (meth)acrylate and/or styrene(meth)acrylate polymers are employed as (a), they may be derived from polymers of styrene and/or esters of acrylic acid and/or methacrylic acid with straight-chain, branched or cyclic aliphatic alcohols having 1 to 22 carbon atoms, preferably methyl methacrylate, ethyl acrylate, n-butyl acrylate, n-butyl methacrylate or 2-ethylhexyl acrylate.

The tackifier resins (b) employed are preferably rosins, especially balsam resins, tall resins or root resins, or hydrocarbon resins, especially terpene resins or coumarone-indene resins, which if desired can also be modified, preferably by esterification with polyhydric alcohols, for example ethylene glycol, glycerol or pentaerythritol. The tackifier resins (b) are preferably employed in amounts of from 50 to 300% by weight, in particular from 70 to 200% by weight and, with particular preference, from 90 to 150% by weight, based on the weight of the polymer (a).

Suitable protective colloids (c), if employed, include preferably polyvinyl alcohols, etherified cellulose derivatives, for example, hydroxyethylcellulose, methylcellulose, carboxymethylcellulose, water-soluble or hydrolytically degraded starches, lignin sulfonate, melamine-formaldehyde sulfonates, naphthalene-formaldehyde sulfonates, poly(meth)-acrylic acid, poly (meth)acrylamide, polyvinylsulfonic acids, polyvinylpyrrolidone, styrene-maleic acid and vinyl ether-maleic acid copolymers, and mixtures thereof. Particularly suitable protective colloids include polyvinyl alcohols with a degree of hydrolysis of from 70 to 100 mol-%.

The protective colloids (c) may be employed in amounts of from 0 to 60% by weight, preferably from 5 to 50% by weight and, in particular, from 10 to 40% by weight, based on the overall amount of polymer (a) and tackifier resins (b).

In addition, it is also possible to optionally employ emulsifiers, preferably of the nonionic type. Examples of suitable include ethoxylation products of propylene oxide, alkyl polyglycol ethers, preferably ethoxylation products of lauryl alcohol, oleyl alcohol, stearyl alcohol or coconut fatty alcohol, and also alkylphenol polyglycol ethers, preferably ethoxylation products of octylphenol or nonylphenol, diisopropylphenol or triisopropylphenol or of di- or tri-tert-butylphenol.

Suitable as the optional anticaking agent (d) include substances such as quartz, silicic acids, silicates, for example, talc, mica, chlorite, aluminum silicate or carbonates, for example, dolomite, calcium carbonate, or mixtures thereof. Particularly suitable substances include those having mean particle sizes of from 0.1 to 100 μm in amounts of from 0 to 40% by weight, preferably from 5 to 25% by weight, based on overall solids content of the pulverulent adhesive composition.

The invention additionally provides a process for preparing a pulverulent adhesive composition by drying a dispersion comprising polymer (a), tackifier resin (b) and, if desired, protective colloid (c) and anticaking agent (d).

The polymer (a) may be prepared by generally known methods, preferably by emulsion polymerization of the corresponding monomers using a free-radical initiator.

Esterified resins (b) may be prepared by known methods of esterification.

The pulverulent adhesive composition comprising (a) and (b) and, if desired, (c) and (d), may be prepared by spray-drying the polymer dispersion in customary spray-drying units. It is also possible to employ atomization using multisubstance nozzles or with a rotating disk. The exit temperature from the spray dryer during preparation of the adhesive composition is preferably in the range from 50 to 80° C. One or more anticaking agents (d) may be added, if desired, in the course of drying.

The pulverulent adhesive compositions lend themselves well to redispersion in water. The particle-size distributions of the dispersions and redispersions employed are generally substantially identical.

The invention also provides for the use of the pulverulent adhesive composition in formulations for the adhesive bonding of porous and semiporous substrates.

The pulverulent adhesive compositions in powder form are particularly suitable for use in flooring adhesives for the adhesive bonding of floor coverings. Also possible are applications in bonding paper, paperboard, polystyrene foam, felt, leather or wood. Laminating adhesives and label adhesives can be mentioned as other possible fields of use.

For the various uses it is possible to add customary additives such as fillers, thickeners, leveling agents. These substances can be incorporated prior to the spraying operation, or else can be incorporated into the adhesive composition.

The examples which follow serve to illustrate the invention in more detail. The parts and percentages indicated are by weight unless noted otherwise.

EXAMPLE 1

The following formulations were prepared:
a)

| | | |
|---|---|---|
| 370 | parts | of a rosin glycol ester |
| 130 | parts | of a rosin glycerol ester |
| 15 | parts | of an ethylene oxide-propylene oxide block polymer (20:80) having a molecular weight of 2500 |
| 285 | parts | of an emulsifier-stabilized dispersion based on vinyl acetate, ethylene and butyl acrylate; solids content: 65%, viscosity (Brookfield, RVT, spindel 3): 2000 mPa · s, Tg: −8° C. |
| 840 | parts | of a polyvinyl alcohol solution (solids content: 25%, viscosity of a 4% strength aqueous solution of 20° C.: 4 mPa · s, degree of hydrolysis: 88%, mean degree of polymerization: 630) |
| 700 | parts | of deionized water | b)

| | | |
|---|---|---|
| 370 | parts | of a rosin glycol ester |
| 130 | parts | of a rosin glycerol ester |
| 15 | parts | of an ethylene oxide-propylene oxide block polymer (20:80) having a molecular weight of 2500 |
| 285 | parts | of an emulsifier-stabilized dispersion based on vinyl acetate, ethylene and butyl acrylate; solids content: 65%, viscosity (Brookfield, RVT, spindel 3): 2000 mPa · s, Tg: −8° C. |
| 1680 | parts | of a polyvinyl alcohol solution (solids content: 25%, viscosity of a 4% strength aqueous solution of 20° C.: 4 mPa · s, degree of hydrolysis: 88%, mean degree of polymerization: 630) |
| 950 | parts | of deionized water |

The formulations were spray-dried with the addition of an anticaking agent combination comprising talc and dolomite (spray dryer from Niro, entry temperature 130° C., exit temperature: 65° C., throughput: 1 kg/hour). The content of anticaking agent was 12%.

The isolated dispersion powders (1a) and (1b) were employed in the following formulation for a pulverulent floor adhesive:

160 parts of dispersion powder (1a) or (1b)
40 parts of gypsum
12 parts of starch (®Emcol, Emsland-Stärke GmbH)
20 parts of sucrose The respective powder mixture was introduced into 200 parts of water, with stirring, and stirring was continued for 5 minutes. After a standing time of 20 minutes, stirring was repeated vigorously for 5 minutes more, after which the adhesives are ready for use.

The resulting adhesives are easy to process and have a solids content of 53% and a viscosity of 23,000 (1a) or 26,000 mPa·s (1b) respectively, Brookfield spindel 7/20 rpm. The lay-in time or open time of the adhesives is 60 minutes. In accordance with DIN 53269, bonds were carried out with a double carpet backing (a difficult-to-bond material) and a needlefelt. In order to test the behavior of the adhesive at temperatures >50° C. as well, the DIN 53269 standard was deviated from in that test specimens were also stored at 70° C. (the standard prescribes only 23° C. and 50° C.).

The resulting bonding strengths at storage temperatures of 23° C., 50° C. and 70° C. are summarized in the table below:

| | | Peel resistance [N/cm] | | |
|---|---|---|---|---|
| Example No. | Covering | 23° C. | 50° C. | 70° C. |
| 1a) | Carpet | 7 | 5 | 9 |
| 1b) | Carpet | 7 | 7 | 9 |
| 1a) | Needlefelt | 11 | 12 | 16 |
| 1b) | Needlefelt | 15 | 17 | 18 |

EXAMPLE 2

Formulations as described in Example (1a) were prepared and spray-dried, using the following anticaking agents in an amount of 20%:
(2a): combination of talc and dolomite
(2b) spray-dried silicic acid
(2c) gypsum The isolated dispersion powders were employed in the following adhesive formulation:
100 parts of dispersion powder (2a), (2b) or (2c)
40 parts of gypsum
12 parts of starch (Emcol UK-N)
20 parts of sucrose The above powder mixtures were, as described in Example 1, introduced into 200 parts of water. With needlefelt and carpet backing, the following peel strengths were found:

| Example No. | Covering | Peel resistance [N/cm] | | |
|---|---|---|---|---|
| | | 23° C. | 50° C. | 70° C. |
| 2a) | Carpet | 6 | 7 | 7 |
| 2b) | Carpet | 7 | 7 | 6 |
| 2c) | Carpet | 7 | 7 | 7 |
| 2a) | Needlefelt | 10 | 13 | 11 |
| 2b) | Needlefelt | 12 | 12 | 13 |
| 2c) | Needlefelt | 12 | 13 | 14 |

EXAMPLE 3

The following base mixture was prepared:
370 parts of a rosin glycol ester
130 parts of a rosin glycerol ester
15 parts of an ethylene oxide-propylene oxide block polymer (20:80) having a molecular weight of 2500
285 parts of an emulsifier-stabilized dispersion based on vinyl acetate, ethylene and butyl acrylate; solids content: 65%, viscosity (Brookfield, RVT, spindel 3): 2000 mPa·s, Tg: −8° C.
1200 parts of a polyvinyl alcohol solution (solids content: 25%, viscosity of a 4% strength aqueous solution of 20° C.: 4 mPa·s, degree of hydrolysis: 88%, mean degree of polymerization: 630)
900 parts of deionized water
The following dispersions were added to the mixture:
(3a)
600 parts of a dispersion, stabilized with protective colloid, based on vinyl acetate and ethylene; solids content: 50%, Tg: +17° C.
(3b)
600 parts of a dispersion, stabilized with protective colloid, based on vinyl acetate and Versatic acid 10 vinyl ester, solids content: 50%, Tg: +33° C.
(3c)
600 parts of a dispersion, stabilized with protective colloid, based on methyl methacrylate and butyl acrylate; solids content: 50%, Tg: −5° C.
(3d)
600 parts of an emulsifier-stabilized dispersion based on butyl acrylate, styrene; solids content: 50%, Tg: +17° C.

The blends were sprayed with the addition of the anticaking agent combination mentioned in Example 1; the content of anticaking agent was set at 20%.

The powders were introduced into the formulation indicated in Example 2 for a pulverulent flooring adhesive. The adhesives produced by adding water were investigated for their bonding strengths. The table below shows the results:

| Example No. | Covering | Peel resistance [N/cm] | | |
|---|---|---|---|---|
| | | 23° C. | 50° C. | 70° C. |
| 3a) | Carpet | 5 | 6 | 8 |
| 3b) | Carpet | 6 | 7 | 9 |
| 3c) | Carpet | 8 | 9 | 9 |
| 3d) | Carpet | 6 | 7 | 9 |
| 3a) | Needlefelt | 10 | 12 | 12 |
| 3b) | Needlefelt | 14 | 14 | 14 |
| 3c) | Needlefelt | 15 | 16 | 16 |
| 3d) | Needlefelt | 12 | 14 | 15 |

EXAMPLE 4

The base mixture as in Example 3 was prepared, but the following dispersions were employed instead of the dispersion described therein:

(4a)
335 parts of an emulsifier-stabilized dispersion based on vinyl acetate, ethylene and 2-ethylhexyl acrylate; solids content: 55%, viscosity (Brookfield, RVT, spindel 3): 1800 mPa·s, Tg: −15° C.
(4b)
335 parts of an emulsifier-stabilized dispersion based on vinyl acetate, Versatic acid 10 vinyl ester and ethylene; solids content: 55%, viscosity (Brookfield, RVT, spindel 3): 1900 mPa·s, Tg: −10° C.
600 parts of a dispersion, stabilized by protective colloid, based on vinyl acetate and ethylene; solids content: 50%, Tg: +17° C.
were added to each of the mixtures.

The blends were spray-dried using silicic acid as anticaking agent. The content of anticaking agent was 20%.

The isolated dispersion powders were employed in the adhesive formulation indicated in Example 2. This gives adhesives which are easy to process and have the following bonding strengths:

| Example No. | Covering | Peel resistance [N/cm] | | |
|---|---|---|---|---|
| | | 23° C. | 50° C. | 70° C. |
| 4a) | Carpet | 8 | 7 | 8 |
| 4b) | Carpet | 9 | 8 | 8 |
| 4a) | Needlefelt | 11 | 13 | 12 |
| 4b) | Needlefelt | 15 | 14 | 14 |

EXAMPLE 5

Flooring adhesives are prepared in analogy to Example 3, using the following formulations:

370 parts of a rosin glycol ester
130 parts of a rosin glycerol ester
15 parts of an ethylene oxide-propylene oxide block polymer (20:80) having a molecular weight of 2500
285 parts of an emulsifier-stabilized dispersion based on vinyl acetate, ethylene and butyl acrylate; solids content: 65%, viscosity (Brookfield, RVT, spindel 3): 2000 mPa·s, Tg: −8° C.
1240 parts of a polyvinyl alcohol solution (solids content: 25%, viscosity of a 4% strength aqueous solution of 20° C.: 4 mPa·s, degree of hydrolysis: 88%, mean degree of polymerization: 630)
625 parts of deionized water
Dispersions added:
(5a)
155 parts of a dispersion, stabilized with protective colloid, based on vinyl acetate and ethylene; solids content: 50%, Tg: +17° C.
(5b)
155 parts of a dispersion, stabilized with protective colloid, based on vinyl acetate and Versatic acid 10 vinyl ester; solids content: 50%, Tg: +33° C.
(5c)
155 parts of a dispersion, stabilized with protective colloid, based on vinyl acetate and Versatic acid 10 vinyl ester; solids content: 50%, Tg: +25° C.

The anticaking agent employed (20%) was the spray-dried silicic acid mentioned in Example (2b).

The performance testing results are given in the table below:

| Example No. | Covering | Peel resistance [N/cm] | | |
|---|---|---|---|---|
| | | 23° C. | 50° C. | 70° C. |
| 5a) | Carpet | 5 | 5 | 4 |
| 5b) | Carpet | 3 | 4 | 5 |
| 5c) | Carpet | 4 | 5 | 5 |
| 5a) | Needlefelt | 8 | 9 | 9 |
| 5b) | Needlefelt | 6 | 8 | 10 |
| 5c) | Needlefelt | 7 | 6 | 7 |

EXAMPLE 6

A formulation was prepared as in Example (1b) but replacing the polyvinyl alcohol solution by 1680 parts of a 25% strength dextrin solution (®Avedex 36 LAC 14, AVEBE).

The formulation was sprayed as in Example 1, and was employed in the formulation indicated therein for a pulverulent carpet adhesive. In this case too, adequate bonding strengths were obtained.

The priority document German Application 196 13 931.7, filed Apr. 6, 1996 is incorporated herein in its entirety by reference including the title, abstract, specification, and claims.

Additional advantages, features and modifications will readily occur to those skilled in the art. Therefore, the invention in its broader aspects is not limited to the specific details, and representative devices, shown and described herein. Accordingly, various modifications may be made without departing from the spirit or scope of the general inventive concept as defined by the appended claims and their equivalents.

What is claimed is:

1. A pulverulent adhesive composition comprising
   (a) at least one polymer prepared by emulsion polymerization, selected from the group consisting of vinyl ester polymers, (meth)acrylate polymers and styrene (meth)acrylate polymers,
   (b) at least one tackifying resin,
   (c) optionally, one or more protective colloids, and
   (d) optionally, one or more anticaking agents.

2. A pulverulent adhesive composition as claimed in claim 1, wherein the polymer (a) comprises a vinyl acetate homopolymer or vinyl acetate copolymer.

3. A pulverulent adhesive composition as claimed in claim 1, wherein the resin (b) is selected from the group consisting of rosins and hydrocarbon resins.

4. A pulverulent adhesive composition as claimed in claim 1, wherein the resin (b) comprises a rosin which is esterified with polyhydric alcohol from the group consisting of ethylene glycol, glycerol and pentaerythritol.

5. A pulverulent adhesive composition as claimed in claim 1, wherein the proportion of the resin (b) is from 50 to 300% by weight, based on the polymer (a).

6. A pulverulent adhesive composition as claimed in claim 1, which comprises a protective colloid (c) in an amount from 5 to 50% by weight, based on the overall amount of polymer (a) and resin (b).

7. A pulverulent adhesive composition comprising:
   (a) at least one polymer prepared by emulsion polymerization, selected from the group consisting of vinyl ester polymers, (meth)acrylate polymers and styrene (meth)acrylate polymers,
   (b) at least one tackifying resin,
   (c) optionally one or more protective colloids, and
   (d) one or more anticaking agents in an amount of from 5 to 25% by weight, based on the overall amount of solids.

8. A pulverulent adhesive composition as claimed in claim 1, wherein said polymer (a) is selected from the group consisting of vinyl propionate, vinyl pivalate, vinyl esters of 9, 10 or 11 carbon monocarboxylic acids and mixtures thereof, vinyl 2-ethylhexanoate and esters of acrylic and/or methacrylic acid with straight-chain, branched or cyclic alcohols having 1 to 22 carbon atoms.

9. A pulverulent adhesive composition as claimed in claim 1, wherein polymer (a) is at least one selected from the group consisting of (meth)acrylate polymers which are derived from polymers of styrene or esters of acrylic acid or methacrylic acid with straight-chain, branched or cyclic aliphatic alcohols having 1 to 22 carbon atoms and styrene(meth)acrylate polymers which are derived from polymers of styrene or esters of acrylic acid or methacrylic acid with straight-chain, branched or cyclic aliphatic alcohols having 1 to 22 carbon atoms.

10. A pulverulent adhesive composition as claimed in claim 1, wherein said tackifying resin is selected from the group consisting of balsam resins, tall resins, root resins, and hydrocarbon resins.

11. A pulverulent adhesive composition as claimed in claim 1, wherein at least one protective colloid is employed and is selected from the group consisting of polyvinyl alcohols and etherified cellulose derivatives.

12. A pulverulent adhesive composition as claimed in claim 11, wherein said protective colloid is selected from the group consisting of hydroxyethylcellulose, methylcellulose, carboxymethylcellulose, water-soluble or hydrolytically degraded starches, lignin sulfonate, melamine-formaldehyde sulfonates, naphthalene-formaldehyde sulfonates, poly(meth)acrylic acid, poly(meth)acrylamide, polyvinylsulfonic acids, polyvinylpyrrolidone, styrene-maleic acid and vinyl ethermaleic acid copolymers, and mixtures thereof.

13. A pulverulent adhesive composition as claimed in claim 11, wherein said protective colliod is a polyvinyl alcohol with a degree of hydrolysis of from 70 to 100 mol-%.

14. A pulverulent adhesive composition comprising:
   (a) at least one polymer prepared by emulsion polymerization, selected from the group consisting of vinyl ester polymers, (meth)acrylate polymers and styrene (meth)acrylate polymers,
   (b) at least one tackifying resin,
   (c) optionally, one or more protective colloids,
   (d) optionally, one or more anticaking agents and
   (e) a nonionic emulsifier.

15. A pulverulent adhesive composition comprising:
   (a) at least one polymer prepared by emulsion polymerization, selected from the group consisting of vinyl ester polymers, (meth)acrylate polymers and styrene (meth)acrylate polymers,
   (b) at least one tackifying resin,
   (c) optionally, one or more protective colloids, and
   (d) one or more anticaking agents selected from the group consisting of quartz, silicic acids, silicates, carbonates, and mixtures thereof.

16. A process for preparing a pulverulent adhesive composition as claimed in claim 1, comprising
   preparing said polymer (a) by emulsion polymerization;

spray drying a dispersion comprising said polymer (a), said tackifier resin (b) and, optionally, said protective colloid (c) and, optionally, said anticaking agent (d).

17. A process for using the pulverulent adhesive composition as claimed in claim 1, comprising redispersing said pulverulent adhesive composition in water.

18. A process for preparing a formulation suitable for use in adhesive bonding of porous and/or semiporous substrates, comprising redispersing said pulverulent adhesive composition as claimed in claim 1, in water.

19. A process for bonding of floor coverings comprising adhering a floor covering layer to a base layer with an aqueous composition comprising a pulverulent adhesive composition as claimed in claim 1.

20. A process for preparing a floor covering adhesive, comprising redispersing a pulverulent adhesive composition as claimed in claim 1, in water.

21. A pulverulent adhesive composition according to claim 1 that has been prepared by spray drying.

22. A pulverulent adhesive composition according to claim 1, wherein said emulsion polymerization is conducted using at least one water-soluble initiator.

23. A process according to claim 16, wherein said emulsion polymerization is conducted using at least one water-soluble initiator.

* * * * *